United States Patent [19]

Deck et al.

[11] Patent Number: 4,895,825
[45] Date of Patent: Jan. 23, 1990

[54] HIGH-POROSITY SILICOCALCAREOUS MASS FOR STORING OF GAS, AND PRODUCTION PROCESS

[75] Inventors: Philippe Deck, Montreuil; Georges Delode, Champigny-sur-Marne; Gerard Vagnard, Bagnolet, all of France; Bartolomeo Colturri, Milan, Italy

[73] Assignee: L'Air Liquide, Paris, France

[21] Appl. No.: 143,065

[22] Filed: Jan. 12, 1988

Related U.S. Application Data

[63] Continuation-in-part of Ser. No. 66,350, Jun. 25, 1987, abandoned.

[30] Foreign Application Priority Data

Sep. 18, 1986 [FR] France .................. 86 13060

[51] Int. Cl.$^4$ .................. B01J 20/10; B05D 7/22
[52] U.S. Cl. .................. 502/407; 427/238; 427/239; 427/377; 427/397.7; 427/397.8
[58] Field of Search .......... 427/239, 230, 238, 377, 427/376.2, 376.4, 380, 397.7, 397.8; 428/35, 462, 464, 469, 472; 106/125; 502/407; 206/0.7; 501/95, 123

[56] References Cited

U.S. PATENT DOCUMENTS

| | | | |
|---|---|---|---|
| 3,895,096 | 7/1975 | Helser | 423/155 |
| 3,909,345 | 9/1975 | Parker | 162/72 |
| 4,238,240 | 12/1980 | Krijgsman | 106/120 |
| 4,349,463 | 9/1982 | Flaniger | 252/457 |
| 4,402,892 | 9/1983 | Helser | 264/42 |
| 4,451,332 | 5/1984 | Annergren et al. | 162/30.1 |
| 4,467,040 | 8/1984 | Bruni | 501/80 |
| 4,467,041 | 8/1984 | Bruni | 501/80 |
| 4,721,698 | 1/1988 | Bruni et al. | 502/407 |

FOREIGN PATENT DOCUMENTS

| | | |
|---|---|---|
| 0056645 | 7/1982 | European Pat. Off. . |
| 0127960 | 5/1984 | European Pat. Off. . |
| 1358446 | 2/1963 | France . |

*Primary Examiner*—Janyce Bell
*Attorney, Agent, or Firm*—Browdy and Neimark

[57] ABSTRACT

A silicocalcareous mass obtained from an aqueous paste with a base of natural silica and quicklime. The mass is at least doubly stabilized by two mineral suspending agents, and reinforced by a fibrous reinforcing agent. The suspending agent comprises cellulose fibers which may be partially chemically delignified, partially mechanically delignified, or delignified by a combination of chemical and mechanical processes, introduced in an amount of from about 3 to about 30% by weight of the solids. The porous silicocalcareous masses are used for lining containers for gas storage, particularly for containers for storing acetylene gas.

7 Claims, 20 Drawing Sheets

HIGH-POROSITY SILICOCALCAREOUS MASS FOR STORING OF GAS, AND PRODUCTION PROCESS

This is a CIP of parent co-pending application Ser. No. 066,350, filed June 25, 1987, now abandoned.

FIELD OF INVENTION

The present invention relates to a high-porosity silicocalcareous mass which can be used as lining materials for containers intended to store gases, in particular containers for storing dissolved acetylene.

BACKGROUND OF THE INVENTION

In current industrial practice, known silicocalcareous masses are produced from an intimate mixture of lime, ground or fossil silica and asbestos suspended in water. The paste thus obtained, introduced into containers, of the bottle type, is then subjected to the action of steam in an autoclave to initiate and completely perform the lime-silica reaction which gives rise to the silicocalcareous mass; then it is transferred into a drying furnace to eliminate the water and create the desired porosity.

Asbestos is added to the aqueous composition of silica and lime for its action of reinforcing fiber and suspending agent. Now, recent constraints relating to health and safety conditions linked to the handling of asbestos have led to reconsidering the use of this natural fiber whose characteristic properties, in the production of porous silicocalcareous masses, are to strengthen the crystalline structure and to cooperate in maintaining the suspension of solid products: silica and lime in a large amount of water.

It is known that the stabilization of the paste before cooking can be notably improved by the use of suspending agents. From French Pat. No. 1 358 446 it is known of to add substantial amounts up to 10% of organic agents for putting the paste materials into suspension. Some cellulose derivatives, such as alkyl hydroxyalkyl celluloses, in particular methyl and ethyl hydroxyethyl celluloses, make it possible to obtain an excellent stabilization of the suspension containing asbestos.

Consideration has been given to compensating for the elimination of asbestos by the addition of suspending agents in large amounts. Now, it was found that if the addition of an organic suspending agent in large amount can notably correct the decanting defect of solid products during production of the silica/lime paste and water, because of the destruction of this type of organic compound during cooking of the paste, a lowering of the mechanical properties of the high-porosity silicocalcareous masses was noted. The fragility and friability of the porous materials thus obtained are such that they are unsuitable for the application in question.

Further, European Pat. No. 0064 916 teaches that the addition of amorphous ultrafine synthetic silica with a large specific surface of 150 to 300 m$^2$ per gram of high absorption capacity, as total or partial replacement of the ground silica, makes it possible to obtain homogeneous silicocalcareous masses with a porosity on the order of 90% and exhibiting a crushing strength of 1.5 to 2 MPa. However, the large amount of amorphous ultrafine synthetic silica, representing 70 to 100% by weight of the total silica, causes a certain difficulty in working up the paste and leads to a high cost in obtaining silicocalcareous masses on an industrial scale.

In the field of thermal insulation with cement type materials, the use of various reinforcing fibers, of organic or mineral origin, has been considered.

Thus, U.S. Pat. No. 4 128 434 specifies the use of wood fibers, polyester, cotton or the like, replacing asbestos, in working up of high-density thermal insulating material in the form of molded slabs or panels.

The use of cellulose fibers was considered in U.S. Pat. No. 4 238 240, also in the sector of thermal insulations, obtained by compacting of a paste previously subjected to a cooking toward 800° C.

U.S. Pat. No. 3 895 096 proposes using cellulose fibers and alkaline-resistant glass fibers in the production of a very porous, very light, slightly resistant material.

The qualities required for a good thermal insulation are different from those required for a mass intended for storing of dissolved gas. The silicocalcareous mass is to be formed directly inside the bottle under such conditions that it is monolithic, homogeneous and fills the cylinder and head of the bottle without lacunas. After cooking in an autoclave, then drying, the bottle of acetylene, filled with silicocalcareous mass, is ready to use.

Further, the porous masses used in filling the bottles should meet the requirements of solidity. For, the porous mass contained in the bottles of gas is subjected to impacts and vibrations during shipment and handling of the bottles. Further, the mass should resist the stresses of successive emptyings and fillings with gas and of the possible solvent of this gas.

On the other hand, an excellent thermal insulation should have the slightest possible density while having a relatively low mechanical strength.

All the techniques proposed for obtaining thermal insulating materials, which do not take into account decanting or seperation of the paste, and therefore also do not take into account the homogeneity of the final material and direct obtaining in the container of the finished material ready to use, are not suited for the production of homogeneous porous silicocalcareous mass for storing of gas and in particular of acetylene and its solvent.

On the other hand, U.S. Pat. No. 4 349 463 refers to the use of alkaline-resistant glass fibers in the production of masses for storage of acetylene. These very special, expensive fibers lead to the production of a costly industrial product for storing acetylene.

SUMMARY OF THE INVENTION

An inexpensive reinforcement material has been found, fibrous in structure, selected from cellulose fibers very partially mechanically delignified, partially chemically delignified, partially chemically delignified then refined by mechanical treatment. It is advantageous to use 3 to 30% in relation to the solids of cellulose fibers of one of the types mentioned above, or of a mixture of them, partially from 5 to 20%.

This particular type of cellulose fibers represents a good reinforcing agent for porous silicocalcareous masses. The presence of these fibers improves the strength of the porous material, making the product less fragile to impacts. However, this material does not totally prevent the decanting i.e. seperation of the silica and lime during working up of the liquid paste. Now, if this decanting occurred, it would lead to a poor filling of bottles, with large lacunas and shrinkages, which is absolutely unacceptable in the production of mass for storing of dissolved gas. The porous mass obtained after cooking should be monolithic, homogeneous and perfectly fill the bottles to resist a decomposition of the stored gas.

To mitigate this drawback, it was discovered that it is advantageous to use lime slaked with hot water, between 40° and 85° C.; under these conditions it was found that the slaked lime decanted only slightly.

Further, it was found advantageous to stabilize the aqueous paste with several suspending agents. This stabilization is assured by at least two mineral agents for putting into suspension.

The amorphous ultrafine synthetic silica with a specific surface between 150 and 300 $m^2$ per gram acts as a suspending agent being used at a rate of 2 to 5% in relation to the weight of the solids.

A second mineral suspending agent can be made up of glass fibers used in an amount between 0.5 and 5% by weight in relation to the solids. These fibers have the effect of thickening the aqueous paste and therefore of avoiding its decanting. This second mineral suspending agent also can be made up of purified clay, type fuller's earth, used in an amount between 0.1 to 2% by weight in relation to the solids.

The action of mineral agents can be reinforced by an organic agent. The amount of organic suspension for a good suspension of the paste in between 0.5 to 2% by weight in relation to the solids products. Preferably, this suspending agent is selected from the class of alkyl hydroxyalkyl celluloses, the alkyl radical containing from 1 to 2 carbon atoms, in particular ethyl hydroxyethyl cellulose.

According to another embodiment of the invention, in the absence of synthetic silica, the aqueous paste contains a suspending and thickening agent in an amount between 8 and 20% by weight in relation to the solids, this agent being made up of calcium silicate.

The aqueous paste with a base of silica and lime corresponds to a weight ratio of amount of lime to total amount of silica between 0.7 and 1.1, and water is used in an amount at least three times greater than the solids, preferably in a ratio of 3 to 4.5.

The natural silica is in the form of finely ground quartz—quartz powder—most of whose grains are less than or equal to 40 microns.

Preparation of a high-porosity silicocalcareous mass with a base of a mixture of silica and lime, stabilized by several suspending agents, and reinforced by a reinforcing agent of the fibrous type, comprises a series of stages, used according to a determined procedure.

Quicklime is slaked with hot water at a temperature of 40° to 85° C., then the slaked lime is transferred to a mixer.

Then, various additions are made to the slaked lime of other ingredients of the paste, the reinforcing agent and suspending agents in the following order and conditions.

To respect the ratio between the liquid phase and the solids, a supplementary amount of water is added, with stirring at slow speed, followed by a homogenization, still at a slow speed.

By slow speed is meant stirring speeds on the order of 500 revolutions per minute.

Then the reinforcing agent is dispersed in the lime suspension, with stirring at slow speed; to homogenize the suspension the stirring is continued at high speed for 30 minutes.

By high speed is meant stirring speeds on the order of 1000 revolutions per minute.

Into the lime suspension containing cellulose fibers is introduced very partially mechanically delignified, or partially chemically delignified or partially chemically delignified then mechanically refined, cellulose fibers perfectly dispersed with stirring at slow speed, the natural silica and synthetic silica, or synthetic silica and calcium silicate mixture. At the end of the addition the stirring at low speed and under partial vacuum, between 0.06 and 0.08 MPa, is continued for 10 minutes.

According to another embodiment, the liquid paste is stabilized by introduction under stirring at slow speed of the organic suspending agent. At the end of this addition, the stirring at slow speed and under the same order of magnitude as above is continued for 10 minutes.

Then, the second mineral agent is introduced, with stirring at slow speed, and after addition the stirring is continued under vacuum at slow speed for 2 to 3 minutes.

Then, the reinforced and stabilized liquid paste under partial vacuum, between 0.08 and 0.09 MPa, is transferred into the storage containers of the dissolved gases.

The bottles are kept in an autoclave under saturation steam pressure, approximatively of 1 MPa, for about twenty hours.

Finally, the porous mass filling the bottles is dried in a furnace for about 7 days at a temperature less than or equal to 170° C.

The porous material obtained by the process described perfectly fills the body and top of the bottle. The longitudinal shrinkage is less than 1 mm. The mass is monolithic, homogeneous, with a porosity between 88 and 90.5%, the density is between 0.240 kg/l and 0.280 kg/l, the compressive strength is 1.5 MPa to 3.5 MPa, it is suitable for storing gases, such as acetylene-ethylene, acetylene-ethylene-propylene mixtures, and in particular acetylene in solution.

DETAILED DESCRIPTION OF THE INVENTION

Examples that illustrate the invention in a nonlimiting way are given below.

EXAMPLE 1

15.3 kg of quicklime is slaked with 48.1 liters of hot water at 72° C. The quicklime is transferred into a mixer, then five successive additions into the quicklime are made in the following order and under the following conditions.

101.9 liters of additional water is added and stirring at slow speed, on the order of 500 rpm, is performed, then with stirring at slow speed 2.1 kg of long fibers of partially chemically delignified cellulose is dispersed. After the end of the introduction, stirring at high speed of 1000 rpm is performed for about 30 minutes.

A mixture consisting of 15.3 kg of natural ground silica (40 microns) and 11.7 kg of calcium silicate is introduced, and stirring under a vacuum of 0.06 MPa is performed for 10 minutes.

Under stirring at slow speed 0.94 kg of ethyl hydroxyethyl cellulose is added while stirring at slow speed, the stirring at slow speed and under a vacuum of 0.06 MPa is continued for 10 minutes.

Finally, 1.4 kg of glass fibers is added with stirring at slow speed; the stirring at slow speed under vacuum is continued for 2 to 3 minutes.

The homogeneous liquid paste is introduced under partial vacuum of about 0.08 MPa into the bottles used for storing acetylene in the dissolved state.

The full bottles are then provided with a porous plug before being brought into the autoclave. The period of cooking in the autoclave is some twenty hours for a saturation steam pressure of about 1 MPa, the gradual drying in a furnace is performed for 7 days at a temperature of about 150° C.

After drying, the porous masses contained in the bottles are homogenous and exhibit a longitudinal shrinkage less than 1 mm, a crushing strength of 1.5 MPa, a porosity of 88.3% and a density of 0.290 kg/l.

EXAMPLE 2

14.6 kg of quicklime is slaked with 43.9 liters of hot water at 74° C. The quicklime is transferred into a mixer, then five successive additions into the quicklime are made in the following order and under the following conditions.

76.1 liters of additional water is added and stirring at slow speed, on the order of 500 rpm, is performed, then with stirring at slow speed 3.3 kg of long fibers of partially chemically delignified cellulose is dispersed. After the end of the introduction, stirring at high speed of 1000 rpm is performed for about 30 minutes.

Under stirring at slow speed of 500 rpm, a mixture consisting of 13.3 kg of natural ground silica (40 microns) and 0.7 kg of amorphous ultrafine synthetic silica with a specific surface of 200 $m^2/g$ is introduced and stirring under a vacuum of 0.06 MPa is performed for 10 minutes.

Under stirring at slow speed 0.67 kg of ethyl hydroxyethyl cellulose is added while stirring at slow speed. The stirring at slow speed and under a vacuum of 0.06 MPa is continued for 10 minutes.

Finally, 0.67 kg of glass fibers is added with stirring at slow speed; the stirring at slow speed under vacuum is continued for 2 to 3 minutes.

Transfer of the paste into the bottle, cooking in the autoclave and drying of the silicocalcareous mass are performed under the same conditions as above.

After drying, the porous masses contained in the bottles are homogeneous and exhibit a longitudinal shrinkage less than 1 mm, a crushing strength of 3.5 MPa, a porosity of 89.2% and a density of 0.262 kg/l.

EXAMPLE 3

15 kg of quicklime is slaked with 45 liters of hot water at 75° C. The quicklime is transferred into a mixer, then five successive additions into the quicklime are made in the following order and under the following conditions.

75 liters of additional water is added and stirring at slow speed, on the order of 500 rpm, is performed, then with stirring at slow speed 3.3 kg of long fibers of partially chemically delignified cellulose is dispersed. After the end of the introduction, stirring at high speed of 1000 rpm is performed for about 30 minutes.

Under stirring at slow speed of 500 rpm, a mixture consisting of 13.1 kg of natural ground silica (40 microns) and 1.17 kg of amorphous utrafine synthetic silica with a specific surface of 200 $m^2/g$ is introduced and stirring under a vacuum of 0.06 MPa is performed for 10 minutes.

Under stirring at slow speed 0.3 kg of ethyl hydroxyethyl cellulose is added while stirring at slow speed, the stirring at slow speed and under a vacuum of 0.06 MPa is continued for 10 minutes.

Finally, 0.3 kg of glass fibers is added with stirring at slow speed; the stirring at slow speed under vacuum is continued for 2 to 3 minutes.

Transfer of the paste into the bottle, cooking in the autoclave and drying of the silicocalcareous mass are performed under the same conditions as above.

After drying, the porous masses contained in the bottles are homogeneous and exhibit a longitudinal shrinkage less than 1 mm, a crushing strength of 2.3 MPa, a porosity of 88.7% and a density of 0.254 kg/l.

EXAMPLE 4

15 kg of quicklime is slaked with 45 liters of hot water at 75° C. The quicklime is transferred into a mixer, then five successive additions into the quicklime are made in the following order and under the following conditions.

75.2 liters of additional water is added and stirring at slow speed, on the order of 500 rpm, is performed, then with stirring at slow speed 1.1 kg of long fibers of partially chemically delignified cellulose is dispersed, after the end of the introduction stirring at high speed of 1000 rpm is performed for about 30 minutes.

Under stirring at slow speed of 500 rpm, a mixture consisting of 13.1 kg of natural ground silica (40 microns) and 1.2 kg of amorphous ultrafine synthetic silica with a specific surface of 200 $m^2/g$ is introduced and stirring under a vacuum of 0.06 MPa is performed for 10 minutes.

Under stirring at slow speed 1.2 kg of ethyl hydroxyethyl cellulose is added while stirring at slow speed, the stirring at slow speed and under a vacuum of 0.06 MPa is continued for 10 minutes.

Finally, 0.3 kg of glass fibers is added with stirring at slow speed; the stirring at slow speed under vacuum is continued for 2 to 3 minutes.

Transfer of the paste into the bottle, cooking in the autoclave and drying of the silicocalcareous mass are performed under the same conditions as above.

After drying, the porous masses contained in the bottles are homogeneous and exhibit a longitudinal shrinkage less than 1 mm, a crushing strength of 2 MPa, a porosity of 90% and a density of 0.255 kg/l.

EXAMPLE 5

13.1 kg of quicklime is slaked with 40 liters of hot water at 80° C. The quicklime is transferred into a mixer, then five successive additions into the quicklime are made in the following order and under the following conditions.

80.6 liters of additional water is added and stirring at slow speed, on the order of 500 rpm, is performed, then with stirring at slow speed 6.7 kg of long fibers of partially chemically delignified cellulose is dispersed. After the end of the introduction, stirring at high speed of 1000 rpm is performed for about 30 minutes.

Under stirring at slow speed of 500 rpm, a mixture consisting of 11.5 kg of natural ground silica (40 microns) and 1.2 kg of amorphous ultrafine synthetic silica with a specific surface of 200 $m^2/g$ is introduced and stirring under a vacuum of 0.06 MPa is performed for 10 minutes.

Under stirring at slow speed 0.17 kg of ethyl hydroxyethyl cellulose is added while stirring at slow speed, the stirring at slow speed and under a vacuum of 0.06 MPa is continued for 10 minutes.

Finally, 0.7 kg of glass fibers is added with stirring at slow speed; the stirring at slow speed under vacuum is continued for 2 to 3 minutes.

Transfer of the paste into the bottle, cooking in the autoclave and drying of the silicocalcareous mass are performed under the same conditions as above.

After drying, the porous masses contained in the bottles are homogeneous and exhibit a longitudinal shrinkage less than 1 mm, a crushing strength of 1.5 MPa, a porosity of 89.2% and a density of 0.24 kg/l.

EXAMPLE 6

15.7 kg of quickliure is slaked with 47.2 liters of hot water at 85° C. The quicklime is transferred into a mixer, their four successive additions into the quicklime are made in the following order and under the following conditions.

72 liters of additional water is added and stirring at slow speed, on the order of 500 rpm, then with stirring at slow speed 1.7 kg of long fibers delignified than mechanically refined cellulose is dispersed. After the end of introduction, stirring at high speed of 1000 rpm is performed for about 30 minutes.

Under stirring at slow speed of 500 rpm, a mixture consisting of 13.8 kg of natural ground silica (40 microns) and 1.6 kg of amorphous ultrafine synthetic silica with a specific surface of 200 m$^2$/g is introduced and stirring under a vacuum of 0.06 MPa is performed for 10 minutes.

Under stirring at slow speed 0.3 kg of clay, type fuller's earth (Bentone EW$^{(R)}$) is added while stirring at slow speed, the stirring at slow speed and under a vacuum of 0.06 MPa is continued for 10 minutes.

Transfer of the paste into the bottle, cooking in the autoclave and drying of the silicalcareous mass are performed under the same conditions as above.

After drying, the porous masses contained in the bottles are homogeneous and exhibit a longitudinal shrinkage less than 1 mm, a crushing strenght of 2.2 MPa, a porosity of 88% and a density of 0.26 kg/l.

The foregoing description of the specific embodiments of the present invention will so fully reveal the general nature of the invention that others can, by applying current knowledge, readily modify and/or adapt for various applications such specific embodiments without departing from the generic concept, and therefore such adaptations and modifications are intended to be comprehended within the meaning and range of equivalents of the disclosed embodiments. It is to be understood that the phraseology or terminology employed herein is for the purpose of description and not of limitation.

What is claimed is:

1. A process for lining a bottle with a silicocalcareous mass of good strength and uniformity in order to provide a gas storage bottle, said process comprising:
    slaking quickline with hot water at a temperature of about 40°–85° C. to form a first mixture;
    adding additional water to said first mixture and homogenizing the suspension formed by stirring at a slow speed to provide a second mixture;
    dispersing a reinforcing agent in said second mixture to form a third mixture, said reinforcing agent comprising about 3–30% by weight, based on the final dry weight of the lining, of cellulose fibers selected from the group consisting of cellulose fibers which are partially mechanically delignified, partially chemically delignified, and partially chemically delignified and mechanically refined;
    introducing with stirring into the third mixture, a mixture of natural silica and a member selected from the group consisting of about 8–20% by weight of calcium silicate and about 2–5% by weight of amorphous ultrafine synthetic silica having a specific surface area between about 150 and 300 m$^2$ per gram, said amounts being based on the final dry weight of the lining, so as to form a fourth mixture;
    dispersing into the fourth mixture a second mineral suspending agent selected from the group consisting of about 0.5–5% by weight of glass fibers, and purified clay in an amount of about 0.1–2% by weight, these quantities being based on the final dry weight of the lining, and thereby forming a paste;
    transferring said paste under partial vacuum into a bottle to be lined;
    maintaining said bottle containing said paste in autoclave under saturation steam pressure of about 1 MPa for about twenty hours; and
    drying said bottle in furnace for about seven days at a temperature no greater than 170° C.

2. The process of claim 1 wherein the fourth mixture is a mixture of natural silica and from about 8 to about 20% by weight, based on the final dry weight of the lining, of calcium silicate as a suspending and thickening agent, and contains no synthetic silica.

3. The process of claim 1 wherein the ratio by weight of the lime of the first mixture to the total amount of silica of the fourth mixture is from about 0.7 to about 1.1, and the water to form the first and second mixtures is used in an amount which is at least three times greater than that of the final dry weight of the lining.

4. The process of claim 3 wherein the water to form the first and second mixtures is used in a weight ratio to the final dry weight of the lining of from about 3 to about 4.5.

5. A process according to claim 1 further comprising adding to said fourth mixture, prior to the addition of said second mineral suspending agent, about 0.5–2%, based on the final dry weight of the lining, of an alkyl hydroxyalkyl cellulose.

6. A process according to claim 1 wherein said natural silica contained in the fourth mixture comprises finely ground quartz having a median grain size no greater than 40 microns.

7. A gas storage bottle for storing gases therein, said gas storage bottle being filled with a dried homogeneous silicocalcareous mass having a high porosity of 88–90.5% and having a density between 0.240 kg/l and 0.280 kg/l and a compressive strength between 1.5 MPa to 3.5 MPa and constituting
    a dried product of an aqueous paste consisting essentially of and formed by mixing in order
    quicklime slaked with hot water at a temperature of about 40°–85° C.; water; 3–30% by weight based on solids of reinforcing cellulose fibers selected from the group consisting of cellulose fibers which are partially mechanically delignified, partially chemically delignified, and partially chemically delignified and mechanically refined, a mixtured of natural finely ground silica and a member selected from the group consisting of 8–20% based on solids of calcium silicate and 2–5% based on solids of amorphous ultrafine synthetic silica having a specific surface area between about 150 and 300 m$^2$ per gram, the total quantity of silica being such as to provide a weight ratio of lime to silica of between 0.7 and 1.1; a mineral suspending agent selected from the group consisting of 0.5–5% by weight based on solids of glass fibers and 0.1–2% by weight based on solids of purified clay; the water being present in an amount of at least 3 times greater than the amount of solids.

* * * * *